US008401277B2

(12) United States Patent
Kim et al.

(10) Patent No.: US 8,401,277 B2
(45) Date of Patent: Mar. 19, 2013

(54) METHOD FOR RESTORATION OF BUILDING STRUCTURE USING INFINITY HOMOGRAPHIES CALCULATED BASED ON PARALLELOGRAMS

(75) Inventors: Jae-Hean Kim, Daejeon (KR); Jung Jae Yu, Daejeon (KR); Hye-mi Kim, Daejeon (KR); Jaehwan Kim, Daejeon (KR); Jong Sung Kim, Daejeon (KR); Jin Ho Kim, Daejeon (KR); Il-Kwon Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 932 days.

(21) Appl. No.: 12/491,010

(22) Filed: Jun. 24, 2009

(65) Prior Publication Data
US 2010/0158353 A1  Jun. 24, 2010

(30) Foreign Application Priority Data
Dec. 22, 2008  (KR) .................. 10-2008-0131370

(51) Int. Cl.
*G06K 9/00* (2006.01)

(52) U.S. Cl. ...................................... 382/154

(58) Field of Classification Search .................. 382/154
See application file for complete search history.

(56) References Cited

U.S. PATENT DOCUMENTS

| | | | | |
|---|---|---|---|---|
| 6,137,491 A * | 10/2000 | Szeliski | ..................... | 345/419 |
| 7,324,686 B2 * | 1/2008 | Nister | .......................... | 382/154 |
| 2005/0128196 A1 * | 6/2005 | Popescu et al. | ............... | 345/420 |
| 2007/0076977 A1 * | 4/2007 | Chen et al. | .................... | 382/276 |

FOREIGN PATENT DOCUMENTS

| | | |
|---|---|---|
| JP | 2001-512241 | 8/2001 |
| JP | 2005-234698 | 9/2005 |
| KR | 2001-0107403 | 12/2001 |
| KR | 10-2004-0022100 | 3/2004 |
| KR | 10-2007-0095040 | 9/2007 |
| WO | 99/06950 | 2/1999 |

OTHER PUBLICATIONS

Marta Wilczkowiak, et al., "Using Geometric Constraints through Parallelepipeds for Calibration and 3D Modeling," *IEEE Transactions on Pattern Analysis and Machine Intelligence*, vol. 27, No. 2, Feb. 2005, pp. 194-207.

* cited by examiner

*Primary Examiner* — John Strege
(74) *Attorney, Agent, or Firm* — Staas & Halsey LLP

(57) ABSTRACT

A method for restoration of building structure using infinity homographies calculated based on parallelograms includes: calculating, using two or more parallelograms, an infinity homography between those cameras which refer to an arbitrary camera; restoring cameras and the building structure on an affine space using the computed infinity homography and homologous points between images; and transforming the restored result onto the metric space using constraints on orthogonality of vectors joining the restored three-dimensional points, the ratio of lengths of the vectors and intrinsic camera parameters. As a result, intrinsic camera parameters, camera positions on the metric space and the structure of the building are restored. All the restoration is possible even when intrinsic camera parameters corresponding to all the images are not constant.

8 Claims, 7 Drawing Sheets

METHOD FOR RESTORATION OF BUILDING STRUCTURE USING INFINITY HOMOGRAPHIES CALCULATED BASED ON PARALLELOGRAMS

CROSS-REFERENCE(S) TO RELATED APPLICATION(S)

The present invention claims priority of Korean Patent Application No. 10-2008-0131370, filed on Dec. 22, 2008, which is incorporated herein by reference.

FIELD OF THE INVENTION

The present invention relates to a method that restores a building structure, and, in particular, to a method that calculates infinity homographies using parallelograms obtained from photographed building images and restores the building structure using the infinity homographies.

BACKGROUND OF THE INVENTION

Calculating a building structure and a camera position using pictures of a building photographed by a camera can be described as a practice in imaged-based modeling. Not only such a practice has been carried out in a number of research works in the field of computer vision but also it can be used widely in computer graphics, virtual reality and robotics.

The conventional methods of image-based modeling can be categorized into two groups. First, methods based on features extract corresponding feature points from many images and restore the three-dimensional positions of these points and cameras. Second, methods based on primitives take geometric primitives like balls, cylinders, cones or cubes as building blocks for more complex models and carry out a restoration procedure by projecting them again on images as parameters of the models are varied to minimize errors. Primary benefits are precise results with a relatively smaller number of images.

These conventional methods have shortcomings difficult to overcome. The feature-based methods need a relatively great number of images in order to achieve a certain degree of accuracy, whereas the primitive-based methods cannot be applied with ease to general scenes where the primitives are absent.

SUMMARY OF THE INVENTION

In view of the above, the present invention provides a method which calculates infinity homographies using parallelograms when there are only a few images of a building that is subject to restoration and more than two parallelograms are given as the only geometric information. The other object of the present invention is to provide a method that restores the structure of the building using the calculation method.

In accordance with one embodiment of the present invention, there is provided a calculation method for an infinity homography based on parallelograms, including: transforming parallelograms in the three-dimensional space of images photographed by cameras to respective rectangles and calculating rectifying homographies of the respective images; calculating homographies of new images transformed by using the calculated rectifying homographies; calculating a linear constraint for the infinity homography of the respective images by using the rectifying homographies and the calculated homographies of new images; calculating a linear constraint for the infinity homography from a vanishing point by using a relationship between the infinity homography of the images and the vanishing points corresponding to two images; and calculating the infinity homography by using the calculated linear constraints.

In accordance with another embodiment of the present invention, there is provided a method for restoration of a building structure using an infinity homography calculation method based on a parallelogram, including: calculating an infinity homography of the images based on respective parallelograms in the three-dimensional space of images photographed by cameras; restoring the structure of a building and the cameras on an affine space by using the calculated infinity homography; and transforming the affine space to a metric space by using intrinsic parameters of the respective cameras or a constraint on a space recognized in the respective images.

The present invention provides a method which allows not only calibration and restoration of positions of cameras and restoration of a building structure at the same time but also restoration of a building structure with a few images photographed at random or found on the internet, when there are only a few images of a building and parallelograms are the only geometric information for the building subject to restoration.

BRIEF DESCRIPTION OF THE DRAWINGS

The above features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings.

Figure 1:
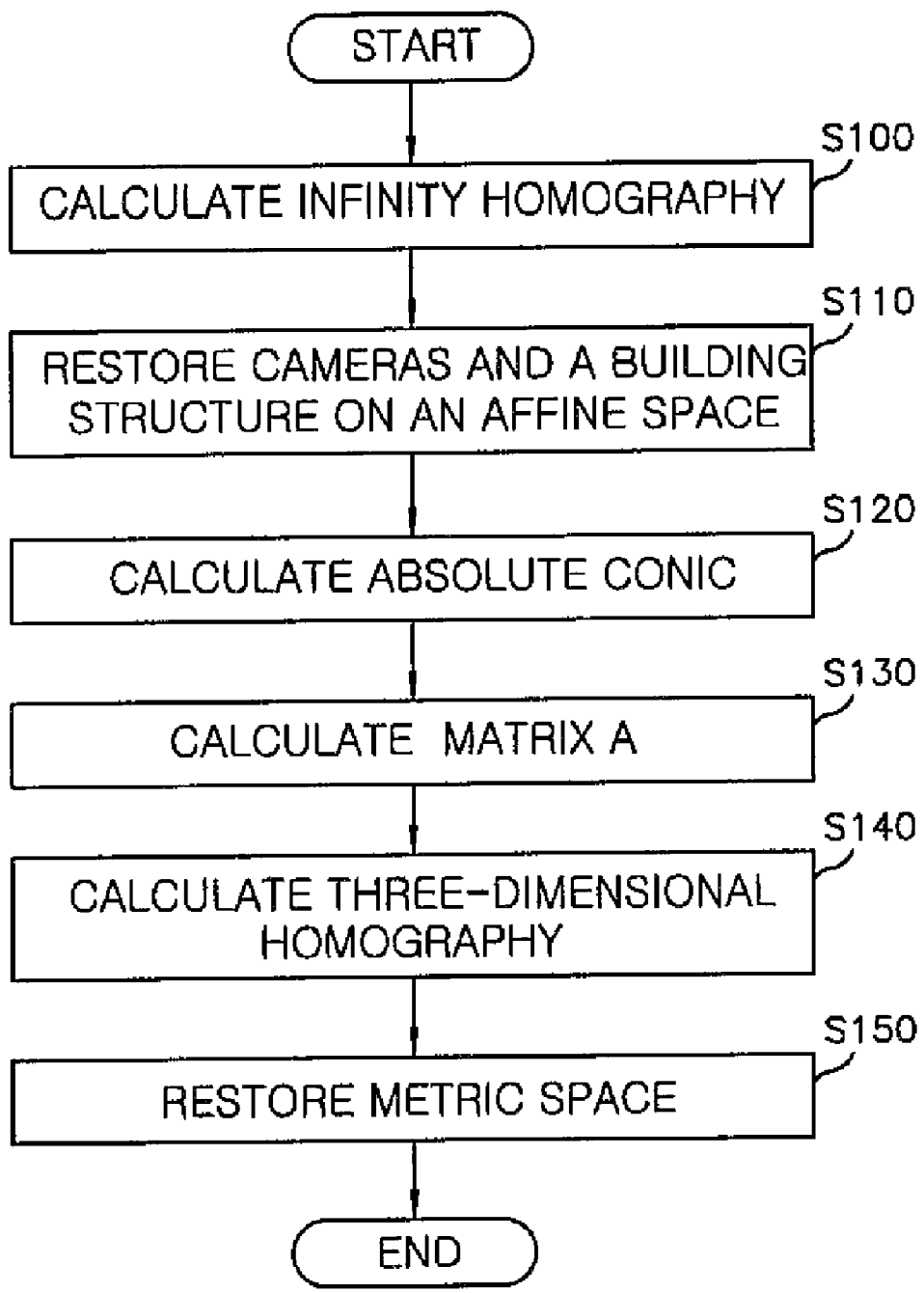
FIG. 1 shows a flowchart of a restoration process of a building structure using a method that calculates an infinity homography based on parallelograms in accordance with an embodiment of the present invention.

FIG. 1 shows a flowchart of a three-dimensional restoration procedure of an object in accordance with an embodiment of the present invention. As shown in FIG. 1, the procedure starts with calculation S100 of infinity homographies $H_\infty$ between images.

Figure 2:
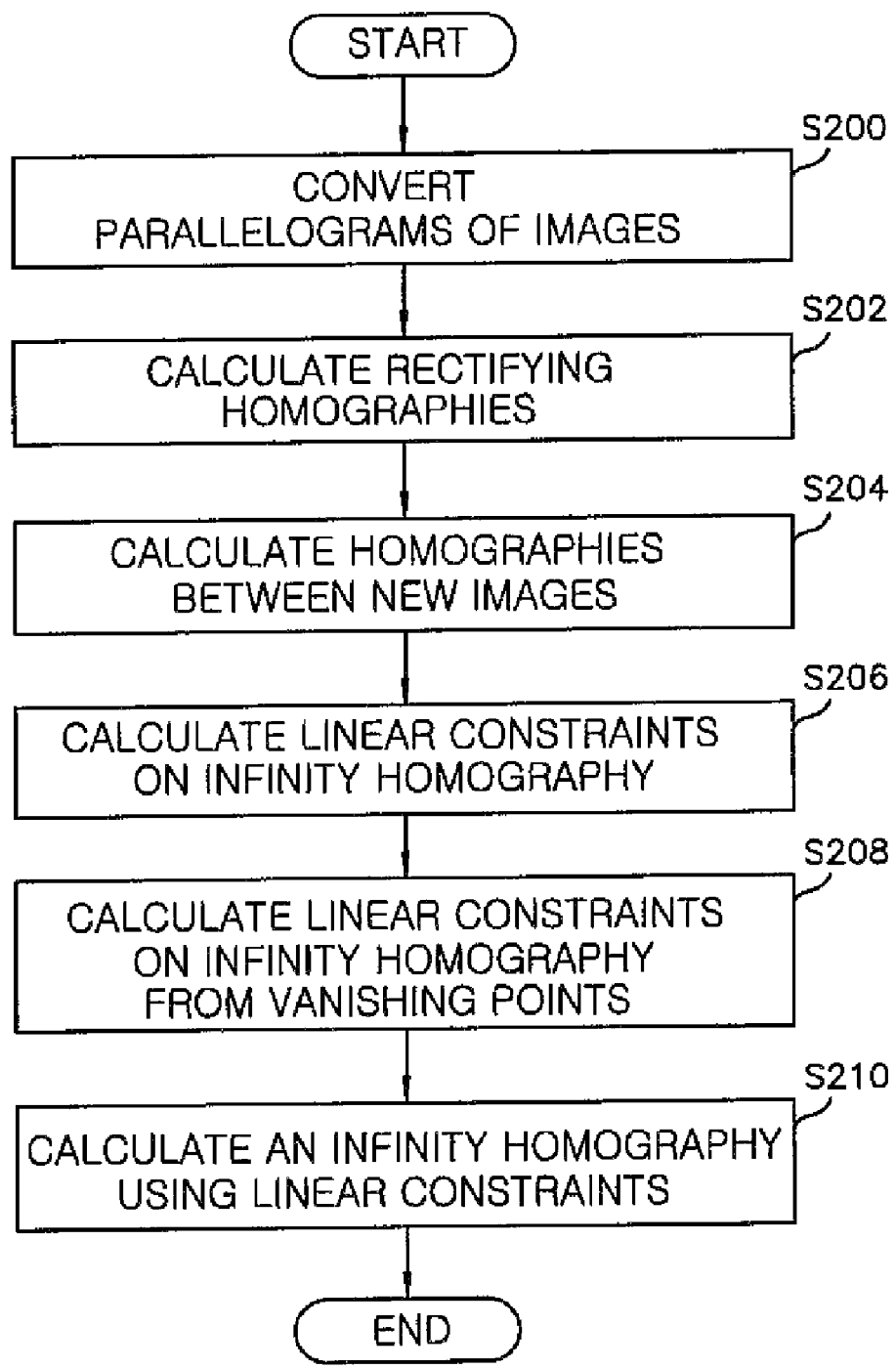
FIG. 2 illustrates a flowchart of a process that calculates an infinity homography in accordance with an embodiment of the present invention.

FIG. 2 illustrates a flowchart of a procedure that calculates an infinity homography $H_\infty$ in accordance with an embodiment of the present invention.

Figure 3A:
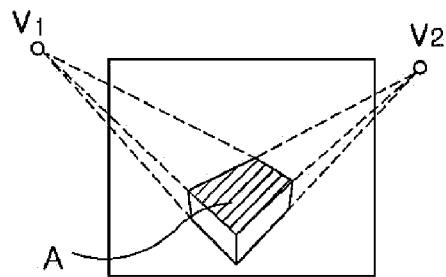
FIGS. 3A to 3D depict an example of rectifying camera images converted by a rectifying homography.
Figure 3B:
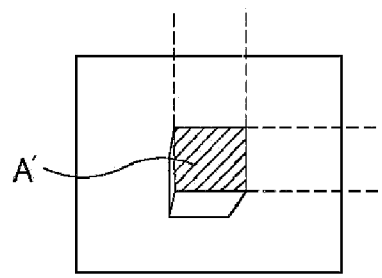
Figure 3C:
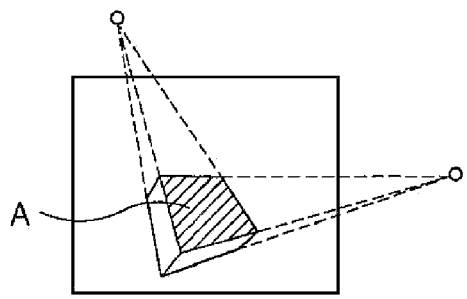
Figure 3D:
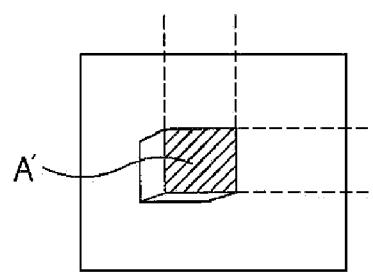

A procedure in which rectifying homographies are calculated for a parallelogram present on an arbitrary object in the three-dimensional space is depicted in FIGS. 3A to 3D. As shown in FIG. 3A, a parallelogram A present on a building, which is an image projected by a camera at a chosen position, can be transformed into an arbitrary rectangle in S200, as depicted in FIG. 3B. The relationship between the rectangle and the parallelogram is given by a two-dimensional rectifying homography $H_{rA1}$, a 3×3 matrix calculated in S202. A similar procedure can be applied to transform same parallelogram, as illustrated in FIG. 3C, obtained by a projected image photographed by another camera into an arbitrary rectangle, as shown in FIG. 3D.

A two-dimensional homography for the transformation between the images in FIGS. 3C to 3D shall be denoted by $H_{rA2}$.

A rectangle used in the calculation of a rectifying homography can be chosen in an arbitrary way, to be of any size or aspect ratio, as long as it remains a rectangle. FIGS. 4A to 4D show that a same procedure depicted in the above is adopted for calculation of rectifying homographies $H_{rB1}$ and $H_{rB2}$ for another parallelogram B present in the image.

Figure 4A:
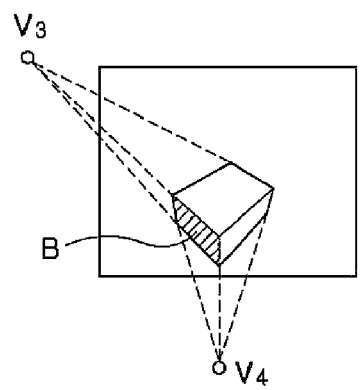
FIGS. 4A to 4D show an example of a situation for the parallelograms not used in FIGS. 3A to 3D.
Figure 4B:
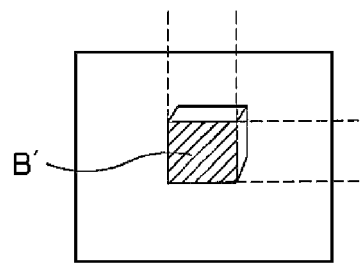
Figure 4C:
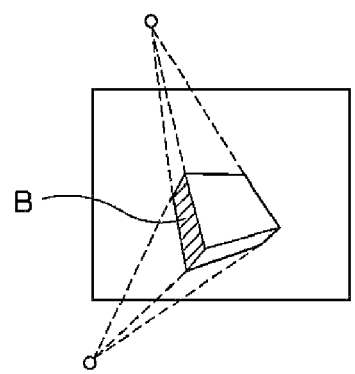
Figure 4D:
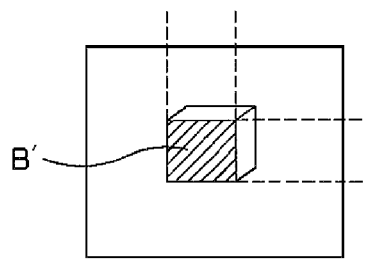

If there are new images transformed from original camera images by using rectifying homographies, a homography between the new images is calculated S204, i.e. a homography $H_{\infty}^{rA}$ between the images in FIGS. 3B and 3D and a homography $H_{\infty}^{rB}$ between the images in FIGS. 4B and 4D. Note that the first two diagonal components, the (1,1) and (2,2) components, have identical values in homographies $H_{\infty}^{rA}$ and $H_{\infty}^{rB}$, respectively.

By denoting by $H_{\infty}$ the infinity homography between original images, e.g. the images in FIGS. 3A and 3C or those in FIGS. 4A and 4C, the relationships between infinity homography $H_{\infty}$ and rectifying homographies, $H_{rA1}$, $H_{rA2}$, $H_{rB1}$, and $H_{rB2}$, for parallelograms A and B are given respectively by $$H_{\infty} = H_{rA2}^{-1} H_{\infty}^{rA} H_{rA1},$$

$$H_{\infty} = H_{rB2}^{-1} H_{\infty}^{rB} H_{rB1}.$$ Equation (1)

These relationships are arranged to yield homographies $H_{\infty}^{rA}$ and $H_{\infty}^{rB}$ between the respective new images:

$$H_{\infty}^{rA} = H_{rA2} H_{\infty} H_{rA1}^{-1},$$

$$H_{\infty}^{rB} = H_{rB2} H_{\infty} H_{rB1}^{-1}.$$ Equation (2)

A linear constraint can be derived for infinity homography $H_{\infty}$ between original images S206 by equating, for example, the first two diagonal components of homography $H_{\infty}^{rA}$ between the new images for parallelogram A in FIGS. 3A to 3D. Such a constraint can also be derived for all parallelograms that can be present in addition to parallelogram A.

As is well known, in general, two vanishing points $v_1$ and $v_2$ corresponding to their respective images are related linearly by infinity homography $H_{\infty}$ between the images as $$v_2 = H_{\infty} v_1.$$ Equation (3)

This relationship indicates that from a vanishing point two linear constraints for infinity homography $H_{\infty}$ can be derived S208.

Since there are more than three vanishing points, $v_1$, $v_2$, $v_3$ and $v_4$, as shown in FIGS. 3A and 4A, eight linear constraints can be obtained for infinity homography $H_{\infty}$ if more than two parallelograms are employed. Because infinity homography $H_{\infty}$ has eight degrees of freedom, it is always possible to calculate the components of infinity homography $H_{\infty}$ with the eight linear constraints S210.

It is of great importance to note that, in the procedure described in the above, the parallelograms depicted in FIGS. 3A and 3B, while they need to be identical on the space, can be used to form a constraint by regarding them as being identical if they can be overlapped by translation. For example, although parallelograms D and E in FIGS. 5 to 8 are different parallelograms on the space, they can be overlapped by translation and hence are regarded as being identical so that they can be used to form the linear constraint described in the above. This is of great use in relaxing the requirement that the fields of views of cameras be overlapped as much as possible in the example addressed in FIGS. 5 to 8.

The next step is to restore the cameras and the structure of a building S110 on the affine space using infinity homography $H_{\infty}$, which will be explained in what follows.

To start with, an image is chosen for a reference and then projection matrix $P_o$ for the reference camera that corresponds to the reference image is given by $$P_o = [I | O],$$ Equation (4)

where I is the 3×3 identity matrix and 0 is the 1×3 zero column vector. By denoting by $H_{\infty}^{i}$ infinity homography between the i th arbitrary camera among the rest and the reference camera, the projection matrix for the i th camera can be given by $$P_i = [H_{\infty}^{i} | t^i],$$ Equation (5)

where $t^i$ is a 1×3 vector to be solved for.

A point $x_i^j$ projected on the ith camera of jth point $x^j$ that is to be restored on the space is given by $$x_i^j = P_i x^j.$$ Equation (6)

Applying this equation for all the points and cameras under consideration leads to a set of simultaneous linear equations. Solving the equations gives restored cameras and building structure on the affine space.

The procedure S120 that transforms the restored result on the affine space into the metric space using the spatial constraints is described henceforth. Since the spatial constraints are extracted from the images by the cameras, these can be information that can be verified directly from the images.

The procedure starts with finding absolute conic $\Omega_{\infty}^{A}$ on the affine space. If two vectors $d_{A1}$ and $d_{A2}$ joining the restored points are orthogonal on the real metric space due to the spatial constraints, they are related by absolute conic $\Omega_{\infty}^{A}$ as $$d_{A1}^T \Omega_{\infty}^{A} d_{A2} = 0.$$ Equation (7)

If the ratio of lengths of two vectors, $d_{A1}$ and $d_{A2}$, is given by r based on the constraints, they are related by absolute conic $\Omega_{\infty}^{A}$ as $$d_{A1}^T \Omega_{\infty}^{A} d_{A1} = r^2 d_{A2}^T \Omega_{\infty}^{A} d_{A2}.$$ Equation (8)

If the ratio of lengths of two vectors, $d_{A1}$ and $d_{A2}$, and the angle they make are given respectively by r and θ, then they are related by absolute conic $\Omega_{\infty}^{A}$ as $$d_{A1}^T \Omega_{\infty}^{A} d_{A2} = r \cos\theta d_{A2}^T \Omega_{\infty}^{A} d_{A2}.$$ Equation (9)

Equations (7) to (9) are results that can be obtained without difficulty for cases of general buildings. A system of homogeneous linear equations can be yielded by using all or part of them. In other words, the relationships between absolute conic $\Omega_{\infty}^{A}$ and vectors $d_{A1}$ and $d_{A2}$ in the above Equations (7) to (9) are applied selectively depending on the acknowledged constraints and by the applied equations homogeneous linear equations are yielded.

The procedure to get absolute conic $\Omega_{\infty}^{A}$ using the constraints of the intrinsic camera parameters is to be addressed in the below. If the intrinsic camera parameters are constant, the relationship between absolute conic $\Omega_\infty^A$ and infinity homography $H_\infty^i$ is given by $$\Omega_\infty^A = H_\infty^{i-T} \Omega_\infty^A H_\infty^{i-1}. \quad \text{Equation (10)}$$

If the pixels are square, the first off-diagonal component of absolute conic $\Omega_\infty^A$ is zero:

$$(H_\infty^{i-1} \Omega_\infty^A H_\infty^{i-1})_{12} = 0, \quad \text{Equation (11)}$$

where $(\Sigma)_{ij}$ denotes the (i,j) th component of an arbitrary matrix $\Sigma$. If the optic axis of the camera passes through the center of the image, the other off-diagonal components of absolute conic $\Omega_\infty^A$ vanish, yielding two other constraints:

$$(H_\infty^{i-1} \Omega_\infty^A H_\infty^{i-1})_{13} = 0,$$

$$(H_\infty^{i-1} \Omega_\infty^A H_\infty^{i-1})_{23} = 0. \quad \text{Equation (12)}$$

If the pixels of the image have an aspect ratio r, then the first two diagonal components of absolute conic $\Omega_\infty^A$ are related by $$r^2 (H_\infty^{i-T} \Omega_\infty^A H_\infty^{i-1})_{11} = (H_\infty^{i-T} \Omega_\infty^A H_\infty^{i-1})_{22}. \quad \text{Equation (13)}$$

Equations (11) to (13) are used to obtain homogeneous linear equations for absolute conic $\Omega_\infty^A$, which, after all the available constraints applied, are solved to give absolute conic $\Omega_\infty^A$.

Now, an A matrix can be calculated S130 by a Choleski factorization of absolute conic $\Omega_\infty^A$:

$$\Omega_\infty^A = A^{-T} A^{-1}. \quad \text{Equation (14)}$$

And three-dimensional homography $H_E^A$ is obtained S140 by the definition given by $$H_E^A = \begin{pmatrix} A & 0 \\ 0 & 1 \end{pmatrix}. \quad \text{Equation (15)}$$

Finally, camera projection $P_i^E$ and points $X_j^E$ on the metric space are obtained by transforming corresponding $P_i$ and $X_j$ on the affine space with application of three-dimensional homography $H_E^A$:

$$P_i^E = H_E^A P_i,$$

$$X_j^E = H_E^{A-1} X_j. \quad \text{Equation (16)}$$

Figure 5:
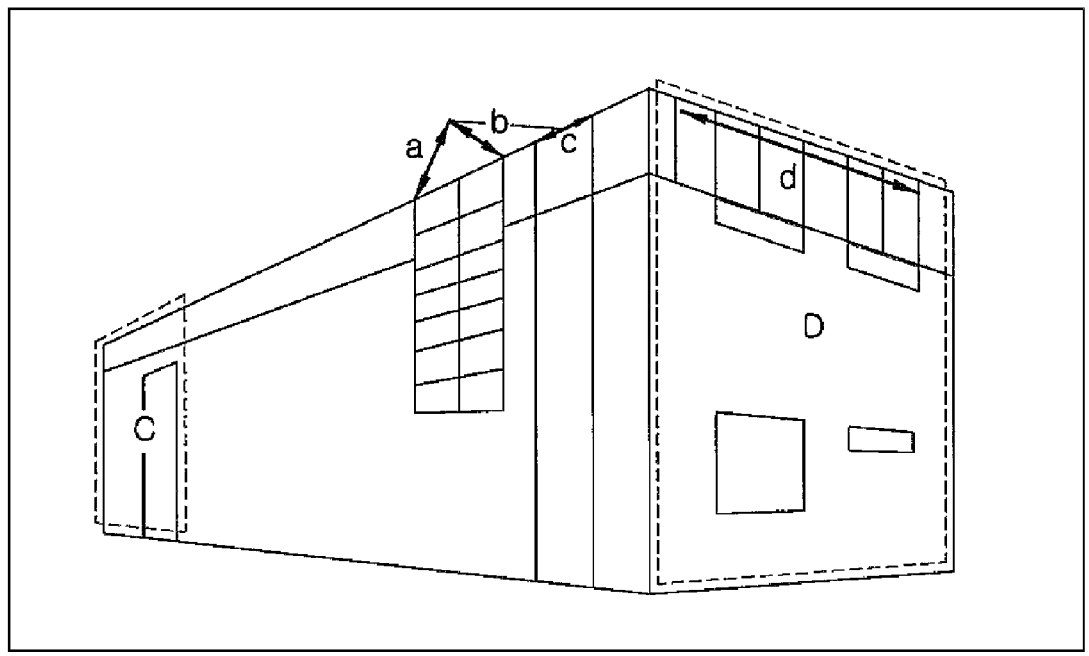
FIG. 5 depicts an image of a building used to verify the contents of the present invention.
Figure 6:
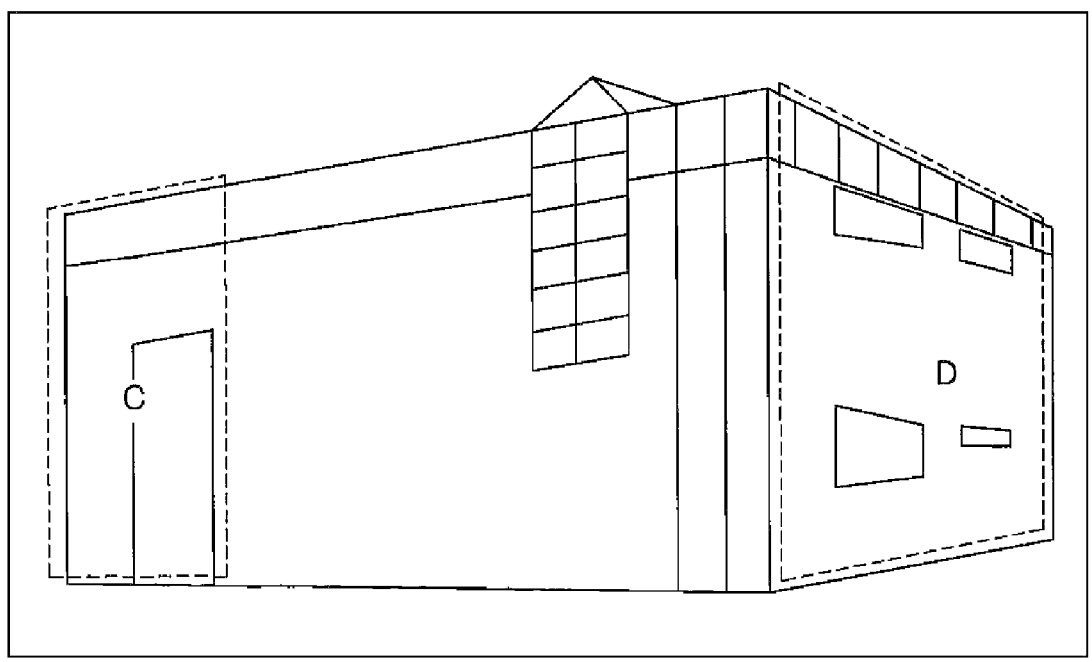
FIG. 6 illustrates an image of a building used to verify the contents of the present invention.
Figure 7:
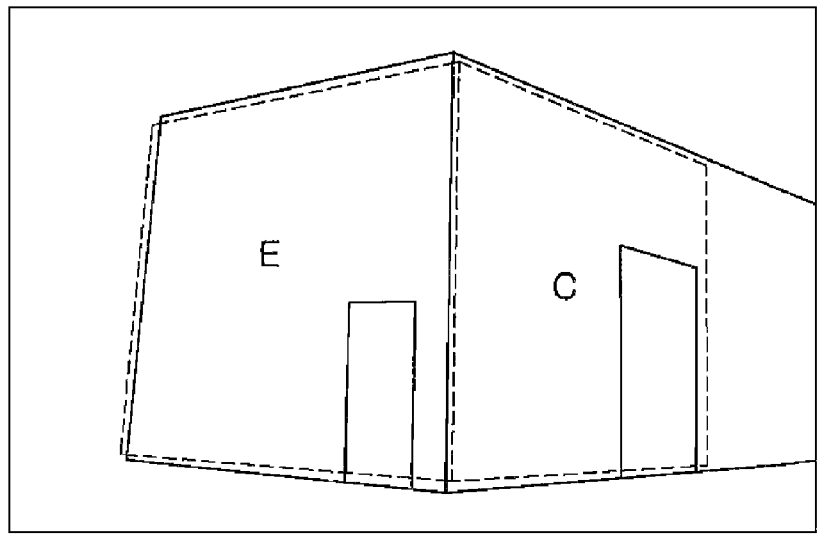
FIG. 7 shows an image of a building used to verify the contents of the present invention.
Figure 8:
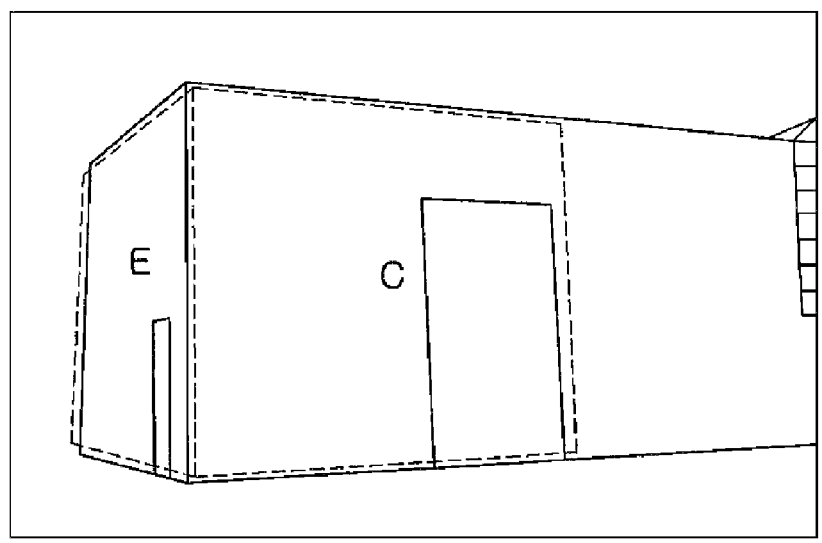
FIG. 8 depicts an image of a building used to verify the contents of the present invention.
Figure 9:
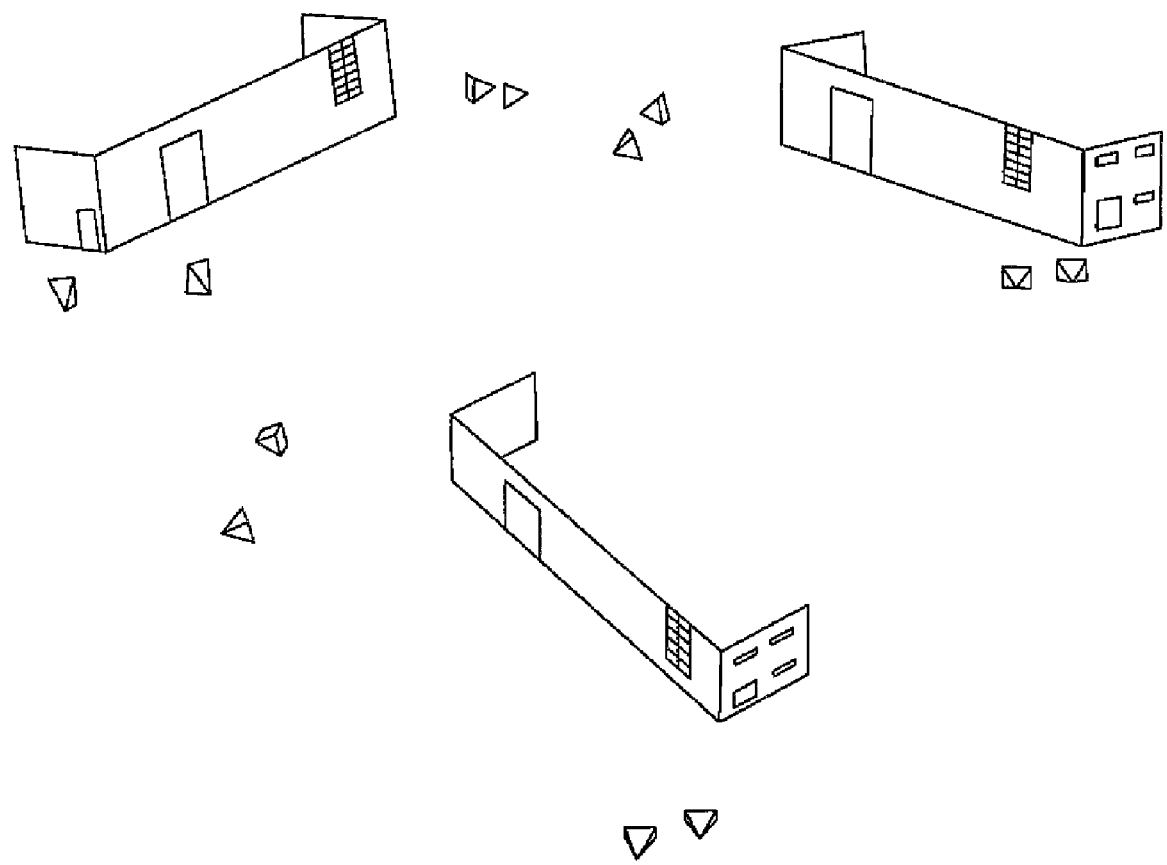
FIG. 9 depicts the restored result of cameras and building obtained by applying the method of the present invention to the images in FIGS. 5 to 8.

FIGS. 5 to 8 are images that are used to verify the embodiments of the present invention. FIG. 9 shows the restored result of cameras and building obtained by applying the method of the present invention to the images in FIGS. 5 to 8. Parallelograms C, D and E are used for the procedure and, as mentioned in the above, parallelograms D and E are regarded as being identical when infinity homography $H_\infty$ is calculated S100. The spatial constraints used here are that vectors a and b in FIG. 5 are orthogonal and that the length ratio of the vectors c and d is 1:6 and that the edges of the building are orthogonal.

The restoration procedure of a three-dimensional structure of a building in accordance with an embodiment of the present invention can be realized in the form of a computer-readable code on a computer-readable record medium. Computer-readable record media include all sorts of record media on which are stored data that can be read by a computer system. Typical examples are ROM, RAM, CD-ROM, magnetic tape, hard disks, floppy diskettes, flash memory, and optical data storage devices as well as those realizable in the form of carrier waves (e.g. transmission over the internet). Computer-readable record media can be stored and executed as a code readable in a distributive manner on a distributed computer system interconnected on a communication network. The font ROM data structure of the present invention can also be realized as a computer-readable code on record media such as ROM, RAM, CD-ROM, magnetic tape, hard disks, floppy diskettes, flash memory, optical storage devices.

While the invention has been shown and described with respect to the embodiments, it will be understood by those skilled in the art that various changes and modifications may be made without departing from the scope of the invention as defined in the following claims.

What is claimed is:

1. A method for restoration of a building structure using an infinity homography calculation method based on parallelograms, comprising:
    restoring the structure of a building and cameras on an affine space by using an infinity homography; and
    transforming said affine space to a metric space by using intrinsic parameters of said respective cameras or constraints on a space recognized in said respective images,
    wherein said restoring of a building structure further includes:
    choosing one of said images as a reference image;
    defining a camera equation on an affine space for a reference camera taking said chosen image;
    defining a camera equation for an arbitrary camera using an infinity homography between an image taken by said reference camera and another taken by said arbitrary camera other than the reference camera;
    defining an equation for a relationship among points that need to be restored on said affine space and said respective points that are projected to the ith camera; and
    restoring said respective cameras and building structure on an affine space by calculations in said camera equations and said defining equations.

2. The method for restoration of a building structure of claim 1, wherein said transforming of an affine space to a metric space further includes:
    calculating an absolute conic by using cameras and a building structure on said affine space and constraints on a space recognized in said images or intrinsic camera parameters;
    calculating an A matrix using said calculated absolute conic;
    calculating a three-dimensional homography by using said calculated A matrix; and
    transforming said affine space to a metric space by applying said calculated three-dimensional homography to said restored camera equations and points.

3. The method for restoration of a building structure of claim 2, wherein calculating said absolute conic calculates absolute conic $\Omega_\infty^A$ by $$d_{A1}^T \Omega_\infty^A d_{A2} = 0$$

on said affine space, when two arbitrary vectors $d_{A1}$ and $d_{A2}$ joining said restored points are orthogonal in the constraint on said space.

4. The method for restoration of a building structure of claim 2, calculating said absolute conic calculates absolute conic $\Omega_\infty^A$ by $$d_{A1}^T \Omega_\infty^A d_{AS1} = r^2 d_{A2}^T \Omega_\infty^A d_{A2}$$

on said affine space, when two arbitrary vectors $d_{A1}$ and $d_{A2}$ joining said restored points have ratio r of the lengths in said constraint.

5. The method for restoration of a building structure of claim 2, wherein calculating said absolute conic calculates absolute conic $\Omega_\infty^A$ by $$d_{A1}^T \Omega_\infty^A d_{A2} = r \cos \theta d_{A2}^T \Omega_\infty^A d^{A2}$$

on said affine space, when two arbitrary vectors $d_{A1}$ and $d_{A2}$ joining said restored points have ratio r of the lengths and form an angle θ in said constraint.

6. The method for restoration of a building structure of claim 2, wherein calculating said absolute conic calculates said absolute conic $\Omega_\infty^A$ by a relationship $$\Omega_\infty^A = H_\infty^{i-T} \Omega_\infty^A H_\infty^{i-1}$$

between said absolute conic $\Omega_\infty^A$ and infinity homography $H_\infty^i$, if said intrinsic camera parameters are constant.

7. The method for restoration of a building structure of claim 2, wherein calculating said absolute conic calculates said absolute conic $\Omega_\infty^A$ by a relationship $$(H_\infty^{i-T} \Omega_\infty^A H_\infty^{i-1})_{12} = 0$$

between said absolute conic $\Omega_\infty^A$ and infinity homography $H_\infty^i$, if the (i, j)th element of an arbitrary matrix Σ is denoted by $(\Sigma)_{ij}$ and the camera has square pixels.

8. The method for restoration of a building structure of claim 2, wherein calculating said absolute conic calculates said absolute conic $\Omega_\infty^A$ by a relationship $$r^2 (H_\infty^{i-T} \Omega_\infty^A H_\infty^{i-1})_{11} = (H_\infty^{i-T} \Omega_\infty^A H_\infty^{i-1})_{22}$$

between said absolute conic $\Omega_\infty^A$ and infinity homography $H_\infty^i$.

* * * * *